US008355125B2

(12) United States Patent
Lipson et al.

(10) Patent No.: US 8,355,125 B2
(45) Date of Patent: Jan. 15, 2013

(54) ALL REFLECTIVE APPARATUS FOR INJECTING EXCITATION LIGHT AND COLLECTING IN-ELASTICALLY SCATTERED LIGHT FROM A SAMPLE

(75) Inventors: Jan Lipson, Cupertino, CA (US); Donald A. Ice, Milpitas, CA (US)

(73) Assignee: C8 Medisensors Inc., San Jose, CA (US)

(*) Notice: Subject to any disclaimer, the term of this patent is extended or adjusted under 35 U.S.C. 154(b) by 178 days.

(21) Appl. No.: 12/786,001

(22) Filed: May 24, 2010

(65) Prior Publication Data

US 2010/0302535 A1    Dec. 2, 2010

Related U.S. Application Data

(60) Provisional application No. 61/183,470, filed on Jun. 2, 2009.

(51) Int. Cl.
*G01J 3/44* (2006.01)
(52) U.S. Cl. ........................................................ 356/301
(58) Field of Classification Search .................. 356/301, 356/417, 445
See application file for complete search history.

(56) References Cited

U.S. PATENT DOCUMENTS

| 5,225,678 | A | 7/1993 | Messerschmidt |
| 5,311,021 | A | 5/1994 | Messerschmidt |
| 6,310,686 | B1 | 10/2001 | Jiang |
| 6,603,537 | B1* | 8/2003 | Dietz et al. ..................... 356/39 |
| 7,405,855 | B2 | 7/2008 | Riant et al. |
| 7,497,608 | B2 | 3/2009 | Wheatley et al. |
| 2007/0188752 | A1* | 8/2007 | Carr et al. ..................... 356/326 |

OTHER PUBLICATIONS

PCT International Search Report, PCT Application No. PCT/US2010/035967, Jul. 21, 2010, 7 pages.

* cited by examiner

*Primary Examiner* — Tarifur Chowdhury
*Assistant Examiner* — Abdullahi Nur
(74) *Attorney, Agent, or Firm* — Fenwick & West LLP

(57) ABSTRACT

An apparatus is disclosed wherein laser radiation illuminates a sample using all reflective optics and wherein in-elastically scattered light from the sample is collected using the identical elements. The apparatus obviates the problem of contaminating the laser radiation with unwanted spectra from transmissive optics while providing very high rejection of the laser radiation with respect to the in-elastically scattered light. In addition, the apparatus can collect and launch light with high numerical aperture and large field of view.

11 Claims, 2 Drawing Sheets

ALL REFLECTIVE APPARATUS FOR INJECTING EXCITATION LIGHT AND COLLECTING IN-ELASTICALLY SCATTERED LIGHT FROM A SAMPLE

CROSS-REFERENCE TO RELATED APPLICATION

This application claims priority under 35 U.S.C. §119(e) to U.S. Provisional Patent Application Ser. No. 61/183,470, filed Jun. 2, 2009, entitled "All Reflective Apparatus For Injecting Excitation Light And Collecting In-Elastically Scattered Light From A Sample," which is incorporated herein by reference in its entirety.

BACKGROUND OF THE INVENTION

1. The Field of the Invention

This invention relates in general to launching and collecting light for inelastic optical spectroscopy. Specifically, the invention shows how to preserve the spectral purity of the launched light with all reflective optics while simultaneously collecting light from a sample with a wide field of view, re-using the reflective optic nearest the sample and a filter which is used both to reflect the launched light and pass the in-elastically scattered light.

2. Background and Relevant Art

In performing inelastic optical spectroscopy, a sample is irradiated with optical radiation in one wavelength band and emits radiation in a second wavelength band. If the excitation radiation passes through transmitting optical elements prior to impinging on the sample, it is possible for inelastic radiation to be produced by the optics, some of which radiation then being scattered by the sample and interfering with the scattering spectrum of the sample. In consequence, a reflective optic is sometimes employed to both focus the incident radiation on the sample and collect the scattered light from the sample. An example of such an apparatus is disclosed by Messerschmidt in U.S. Pat. No. 5,225,678 where symmetrical pairs of identical parabolic mirrors are used for collection and refocusing. A well known property of such a symmetrical system is that some aberration cancellation can thereby be achieved. In a continuation-in-part application that issued as U.S. Pat. No. 5,311,021, Messerschmidt further discloses an apparatus particular to Raman spectroscopy which is one form of inelastic spectroscopy. Referring to FIG. 14 of U.S. Pat. No. 5,311,021, the input beam is brought to the sample via a hole in a mirror 16, mirror 16 also reflecting scattered radiation from the sample to the detector. A mirror with a hole will exhibit losses with respect to the reflected scattered radiation, which may be important when the scattered signal is weak. Another problem is that laser light may be scattered from the aperture in the mirror, or from optics on the side of the mirror opposite the excitation source, some of which scattered radiation may be incident on the spectroscopic apparatus. In inelastic spectroscopy, rejection of the excitation wavelength is often critical because the scattered radiation may be many orders of magnitude weaker than the excitation radiation, hence it is helpful to avoid the creation of sources of unwanted excitation radiation that may be incident on the spectrometer.

It is possible to perform the function of separating excitation and emission spectra, using an interference reflector, as is taught by Wheatley et al., in U.S. Pat. No. 7,497,608 B2. In Wheatley, the reflector transmits the emission wavelengths while reflecting the excitation wavelengths. The apparatus of Wheatley was intended for illumination only, and in particular, it is not suitable for both illumination of a sample and collection of the scattered radiation from the same side of the sample. The apparatus of Wheatley would require optical access to a second side of the sample which is often impractical.

BRIEF SUMMARY OF THE INVENTION

These and other limitations are addressed by the present invention, which discloses an apparatus whereby all reflective optics are used both to deliver the excitation beam and collect the scattered radiation, advantageously re-using the same parts for both functions. In addition, it is also shown how a wide field of view can be obtained through suitable choices of geometries.

The invention makes use of an off-axis reflector for delivery of the excitation beam and collection of scattered light from the sample. A long-wave-pass interference filter is disposed at an angle with respect to the nominally collimated light emerging from the off-axis reflector. The long-wave-pass (LWP) filter reflects a nominally collimated beam of light from the excitation source to the off-axis reflector while passing the in-elastically scattered light from the sample. It is understood that if the in-elastically scattered radiation is at a wavelength shorter than the excitation wavelength, a short-wave-pass filter can be used in place of the LWP filter. It is also possible to use a bandpass filter of sufficient bandwidth to pass the in-elastically scattered radiation.

In one embodiment, in order to minimize the required wavelength guard-band between the excitation wavelength and the observed inelastic spectra, while simultaneously maximizing the field of view, the LWP filter is disposed at an angle with respect to the direction of propagation of the inelastic spectra that does not exceed a limit, which can be calculated from the ratio of the desired field of view to the focal length of the off-axis reflector. Based also on the compactness of the apparatus, this angle should have a lower bound and is advantageously chosen to be about 12°.

To maximize rejection of unwanted radiation at the excitation source wavelength, a second LWP filter disposed at an angle different from the first LWP filter can be deployed in the nominally collimated region.

DETAILED DESCRIPTION OF THE PREFERRED EMBODIMENTS

Figure 1A:
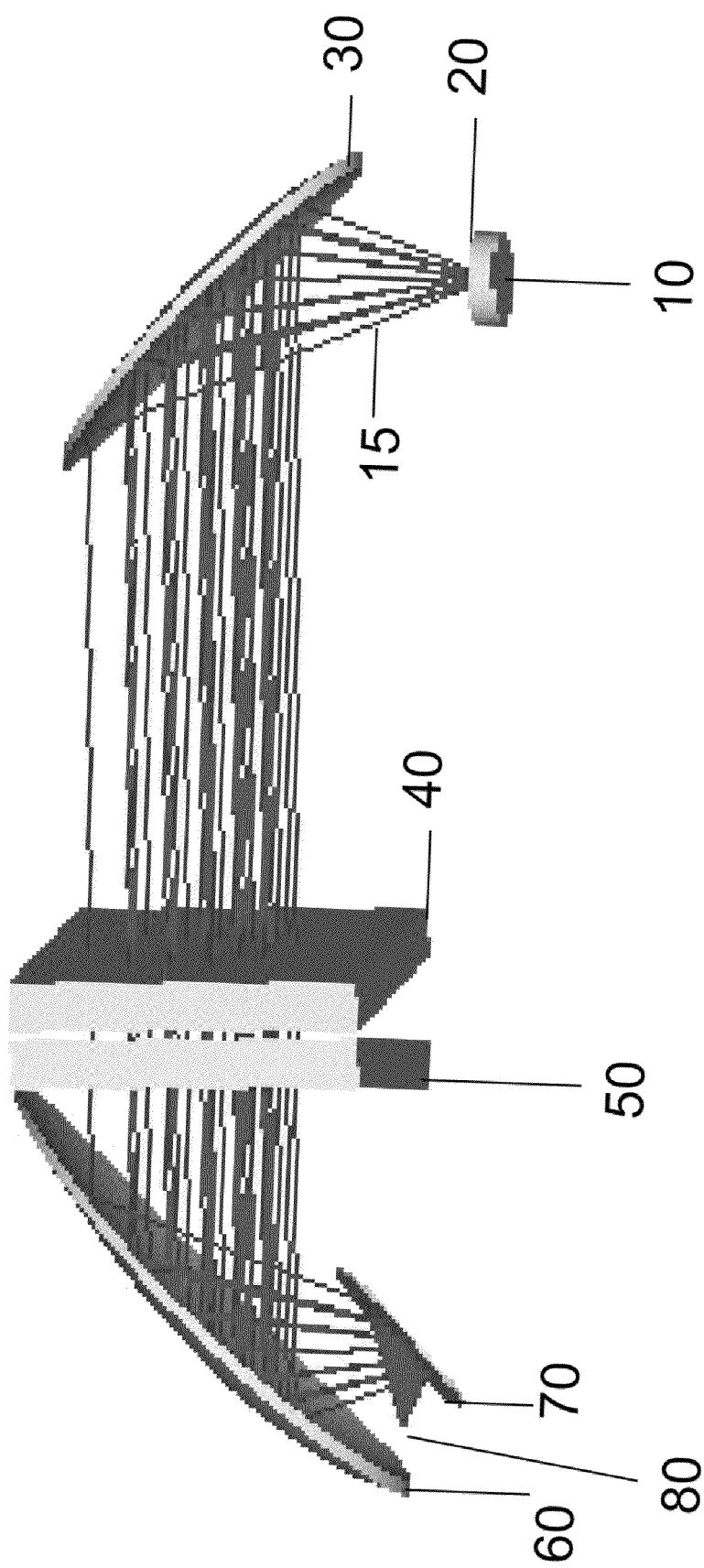
FIG. 1A is an isometric diagram of the optical design showing the rays associated with the collected inelastic spectrum.

Referring to FIG. 1A, the radiation of the scattered inelastic spectrum 15 originates at point 10. After passing through an optical window 20, the radiation 15 is incident on off-axis reflector 30 which nominally collimates the light. The inelastic spectrum passes through a first LWP filter 40 and then through a second LWP filter 50. Note that the LWP filters 40, 50 are disposed at angles with respect to the direction of propagation of the nominally collimated inelastic spectra. The inelastic spectrum is then incident on the second off-axis reflector 60 reflected by plane mirror 70 and comes to focus in the neighborhood of point 80.

Figure 1B:
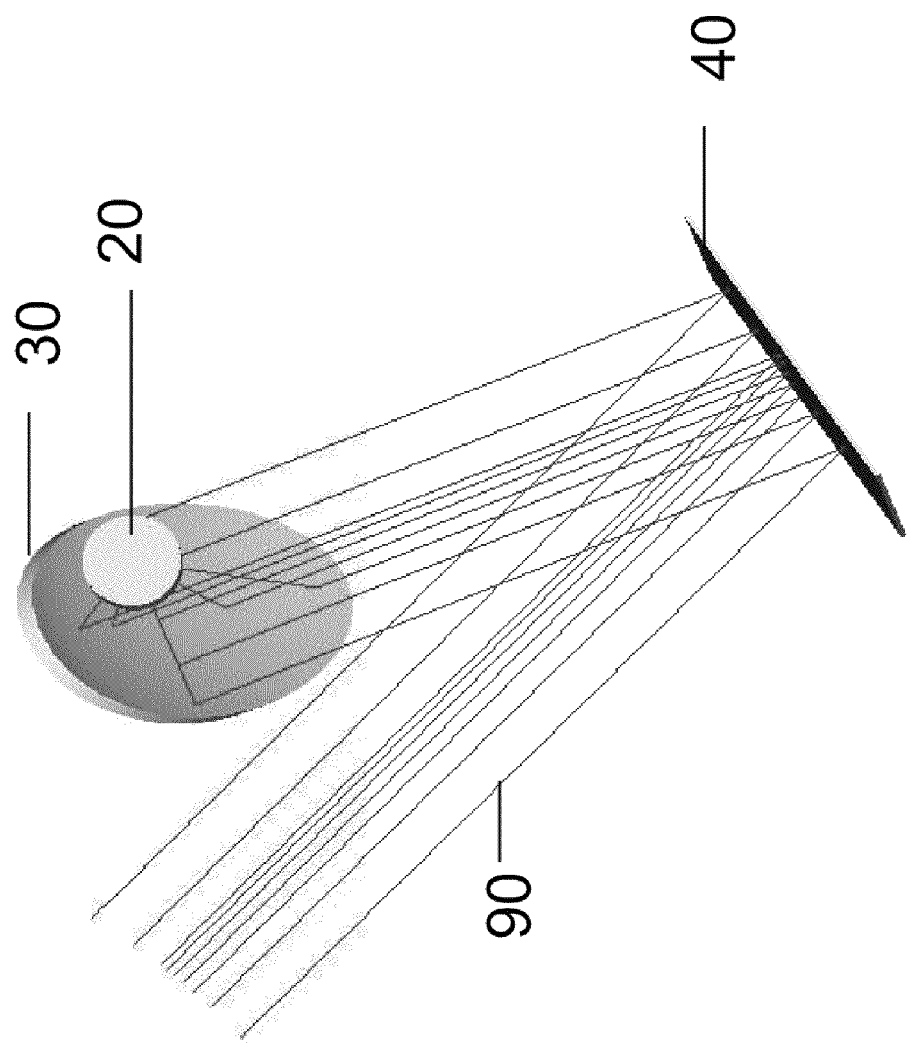
FIG. 1B is an isometric diagram showing the rays associated with the excitation beam, containing only those optical elements which operate on the excitation beam.

Referring to FIG. 1B, the excitation beam 90 is incident on LWP filter 40 by which it is reflected. The excitation beam 90 is then incident on off-axis reflector 30, and focused through window 20. The excitation beam 90 need not come to focus at point 10 of FIG. 1A and can in general be offset from the location from which the inelastic spectrum is collected.

The LWP filter 40 is disposed at an angle I with respect to the nominally collimated light in the region between off-axis reflector 30 and LWP filter 40. In consequence, the excitation beam 90 can clear off-axis reflector 30 and not be substantially vignetted by it. When the compactness of the apparatus is important, the distance between off-axis reflector 30 and LWP filter 40 should be minimized. For a given excitation beam diameter, $D_e$, and a diameter of off-axis reflector 30, $D_r$, and a distance between off-axis reflector 30 and LWP filter 40 of d, for an incidence angle I<<1 radian, the excitation beam will clear off-axis reflector 30 if, $$I > (D_r + D_e)/2d \quad (1),$$

where it is also assumed that the central ray of the excitation beam 90 is incident on the center of off-axis reflector 30, and that the central ray will be deflected by 90° by the off-axis reflector 30.

In many circumstances it is also important to maximize the field of view of the device in order to collect as much signal as possible. If the collection area has a radius of R, and the focal length of the off-axis reflector 30 is f, then for R<<f, the angle B, that a collimated beam originating from an extreme point in the collection area will make with a collimated beam originating from the center will be given by, $$B = R/f \quad (2)$$

The band-edge for an LWP filter for light incident at a non-normal angle will move to a shorter wavelength as compared with the band-edge for normally incident light. The relationship between the band-edge wavelength, W', and the angle of incidence with respect to the surface normal, I, is given by, $$W' = W[1 - (\sin I/n_{eff})^2]^{1/2} \quad (3)$$

where $n_{eff}$ is the effective index of the filter and in general differs on the basis of polarization, and W is the wavelength of the band-edge for normally incident light. An examination of equation 3 shows that the rate of the change of the band-edge with respect to angle is greatest for a nominal angle of 45° and is a monotonically decreasing function of nominal incidence angle for angles less than 45°. As the band-edge shifts to shorter wavelength it becomes necessary to allow an increasingly large guard band between the wavelength of the reflected excitation radiation and the shortest wavelength to be observed of the inelastic scattering spectrum. This can result in the sacrifice of valuable spectral information at the shorter wavelengths. Alternatively, the range of angles illuminating the filter for the inelastic spectrum can be reduced. That would give rise to a reduced range for the angle, I, in equation 3 which would reduce W'–W. From equation 2, a reduction in the range of incident angles is accomplished by reducing the radius of the field of view, which would have the consequence of reducing the collected signal. Alternatively, the focal length of the optics can be increased giving rise to a sacrifice of compactness. From the foregoing it is clear that the nominal angle of incidence of the filter should be made as small as possible, as the sensitivity of the filter band-edge to angular deviations is minimum for small nominal angles of incidence. However, considerations of compactness suggest the opposite course, that being to make the angle as large as possible. It is clear then that there is an optimum range of angles for the filter.

The following example provides design guidelines for a preferred embodiment. Let the distance between the reflector 30 and the focal point 10 be 6 mm. It is advantageous for the form of the reflector to be parabolic. The excitation wavelength is chosen to be 835 nm which is particularly suitable for performing Raman spectroscopy on biological samples. The minimum wavelength desired to be collected in the inelastic scattering spectrum is 850 nm. The LWP filter 40 has a transition between being highly reflecting and highly transmitting which is 7 nm in full width, which is typical for high performance LWP filters that are commercially available. If we collect from an area of radius, R=0.3 mm, the angle B from Eq. 2 is 0.05 radians or 2.9°. If we choose the nominal angle of incidence, I, to be 12°, then the minimum and maximum angles of incidence will be 12°–2.9° and 12°+2.9° or 9.1° and 14.9° respectively. The band-edge of the filter is chosen to be in the middle of the gap between the excitation wavelength and the minimum wavelength to be observed in the inelastic spectrum for an incidence angle of 12°, so in this example, the band-edge, W', is at 842.5 nm. From Eq. 3, the band-edge, W at 0° incidence is then 849 nm for $n_{eff}$=1.7, a typical value for commercial LWP filters, however filters of $n_{eff}$ as low as 1.5 can still be useful. Using this value for W in Eq. 3 we can get W' for the minimum and maximum angles of incidence, hence, W'=845 nm for I=9.1°, and W'=839 nm for I=14.9°. Recalling that the full width of the band is 7 nm, the half-width is then 3.5 nm. The band edge, W', is closest to our minimum wavelength of observation for the inelastic spectrum for the angle of 9.1°. If we add the half width of the required guard-band to the respective band-edge of 845 nm we obtain 848.5 nm, which is still shorter than the minimum wavelength of 850 nm we elected to observe, and hence, meets the proposed requirements. If the difference between the excitation wavelength and the wavelength of the in-elastically scattered radiation nearest the excitation wavelength that is desired to be observed is less than in the above example, the field of view may be required to be reduced, for instance to 0.15 mm radius or 0.3 mm diameter for the reflector and filter in the previous example.

In this example the angle of incidence of the excitation beam 90 on the filter 40 is also 12° as the reflected angle is equal to the incidence angle, hence, in our example the excitation beam will be highly reflected as desired.

For an F/1.4 system the diameter of the off-axis reflector 30, $D_r$, would be 4.3 mm. If the excitation beam 90 exactly fills the reflector 30, the beam diameter, $D_e$, is also 4.3 mm. From Eq. 1, we can therefore deduce that we will need d>20 mm for the excitation beam to clear the off-axis reflector. It is in general possible for the excitation beam 90 to be smaller, however, the system may then have magnification greater than unity with respect to the source of the excitation beam 90. That may be acceptable unless the source is too large in its transverse dimensions as may occur with an array of lasers. If the excitation beam 90 is smaller, the distance d can be reduced. Alternatively, the incidence angle can be reduced. For example, for infinitesimally small incident beams in our example the angle could be reduced to as small as approximately 6°. If the difference between the wavelength of the excitation radiation and the wavelength of the in-elastically scattered radiation nearest in wavelength to the excitation wavelength that is desired to be observed is larger than in the previous example, the angle of incidence can be made larger, for example up to 30°.

Suitable choice of angle gives rise to good rejection of the excitation wavelength for the transmitted light, but that rejection can be further improved by insertion of a second LWP filter, which is shown as item 50 in FIG. 1A. Light which is not rejected by the first LWP can be very highly rejected by a filter, at appreciably 0° angle of incidence, where the sensitivity of the band-edge to angular deviations is minimum. This is particularly suitable for Raman spectroscopy because the signal is very weak compared to the power of the excitation beam. The example presented is expected to provide a rejection of at least nine orders of magnitude, where the first filter is expected to have a rejection of at least three orders of magnitude.

In a particularly preferred embodiment the light associated with the inelastic spectrum is focused to an image by a second off-axis reflector 60 which is chosen to be identical to the first reflector 30, both reflectors being advantageously chosen to be paraboloids. Such a choice minimizes aberrations without adding undue optical complexity. A plane mirror 70 of FIG. 1A can be deployed subsequent to the second off-axis reflector 60 to deflect the focused light in any desired direction for further processing.

It is clear that the optical system suggested in this example can be scaled uniformly in dimension with appreciably similar performance.

Filters having higher $n_{eff}$ can be deployed at larger incidence angles, resulting in more compact devices, while maintaining all other requirements. An LWP filter based on photonic crystals, which are periodic structures in one, two, or three dimensions, can, over some wavelength range, have very high $n_{eff}$, for instance $n_{eff} > 2.0$, and would be particularly desirable for this application.

Choices of surface figures, other than parabolic for the off-axis reflector 30 are possible such as the Schmidt Cassegrain, however it is often important to avoid having the excitation beam pass through transmission optics so as to avoid contamination with fluorescence and Raman scattering from the optical material, hence the aberration correctors normally used for non-parabolic mirrors may be inexpedient.

The optical window 20 in FIG. 1A should be fabricated of a material which does not present a spectrum which will interfere with the spectrum from the sample. Suitable choices for spectroscopy of biological specimens are magnesium fluoride and sapphire. The window 20 is also advantageously chosen to be thin compared to the focal length so that it does not introduce significant spherical aberration.

Although the detailed description contains many specifics, these should not be construed as limiting the scope of the invention, but merely as illustrating different examples and aspects of the invention. It should be appreciated that the scope of the invention includes other embodiments not discussed in detail above. Various other modifications, changes and variations which will be apparent to those skilled in the art may be made in the arrangement, and details of the apparatus of the invention disclosed herein without departing from the spirit and scope of the invention.

The invention claimed is:

1. An apparatus for launching optical radiation onto a sample and for collecting in-elastically scattered radiation from a sample comprising:
   a first parabolic off-axis reflector which focuses nominally collimated radiation onto a sample and collects scattered radiation from the sample;
   an optical window optically located between the first reflector and the sample, the optical window configured such that radiation in-elastically scattered due to the optical window has a first spectrum that does not interfere with a second spectrum of the in-elastically scattered radiation from the sample;
   at least one filter, wherein a filter nearest the first off-axis reflector reflects radiation from an optical source such that it is intercepted by the first off-axis reflector, and wherein the filter nearest the first off-axis reflector transmits in-elastically scattered radiation reflected by the first off-axis reflector,
      the filter nearest the first off-axis reflector being disposed at an angle such that a beam from the optical source, prior to its incidence on the filter will not be substantially intercepted by the first off-axis reflector;
   a second parabolic off-axis reflector which focuses the radiation transmitted by the filter nearest the first off-axis reflector; and
   wherein the apparatus is further configured such that the radiation focused by the second parabolic off-axis reflector has not been transmitted by any transmissive optics capable of in-elastically scattering radiation other than the optical window.

2. The apparatus of claim 1, wherein the means for focusing the radiation transmitted by the filter is a second off-axis reflector of substantially the same form as the first off-axis reflector.

3. The apparatus of claim 1, wherein the filter nearest the first off-axis reflector is disposed at an angle between 6° and 30° with respect to a direction of the radiation from the sample after reflection by the first off-axis reflector.

4. The apparatus of claim 1, wherein the filter nearest the first off-axis reflector has an effective index for either polarization of at least 1.50.

5. The apparatus of claim 4, wherein the filter nearest the first off-axis reflector is constructed from a periodic structure in 2 or more dimensions and wherein the first off-axis reflector has an effective index exceeding 2.0.

6. The apparatus of claim 1, wherein one or more additional filters are deployed further from the first off-axis reflector than the filter nearest the off-axis reflector which reflects the radiation from the optical source, each additional filter not being parallel to the first filter, and each additional filter substantially reflecting radiation having a wavelength of the optical source while passing the in-elastically scattered radiation.

7. The apparatus of claim 6, wherein at least one filter of the one or more additional filters is deployed at a nominal angle of 0° with respect to the nominally collimated beam.

8. The apparatus of claim 1, wherein an optical window is interposed between the sample and the first off-axis reflector.

9. The apparatus of claim 1, wherein the difference between a wavelength of the optical source and a shortest wavelength transmitted by the filter nearest the first off-axis reflector is less than 2% of the nominal wavelength of the optical source.

10. The apparatus of claim 1, wherein a field of view at the sample is greater than 5% of a distance from the first off-axis reflector to a focal point.

11. The apparatus of claim 1, wherein the filter nearest the first off-axis reflector transmits no more than 0.1% of incident radiation from the optical source.

* * * * *